United States Patent
Li et al.

(10) Patent No.: US 11,160,118 B2
(45) Date of Patent: Oct. 26, 2021

(54) RANDOM ACCESS METHOD AND APPARATUS

(71) Applicant: HUAWEI TECHNOLOGIES CO., LTD., Guangdong (CN)

(72) Inventors: Qiming Li, Shenzhen (CN); Jing Han, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 25 days.

(21) Appl. No.: 16/577,066

(22) Filed: Sep. 20, 2019

(65) Prior Publication Data

US 2020/0015283 A1 Jan. 9, 2020

Related U.S. Application Data

(63) Continuation of application No. PCT/CN2017/077941, filed on Mar. 23, 2017.

(51) Int. Cl.
*H04W 74/08* (2009.01)
*H04W 24/10* (2009.01)
(Continued)

(52) U.S. Cl.
CPC ......... *H04W 74/0833* (2013.01); *H04W 4/80* (2018.02); *H04W 24/10* (2013.01);
(Continued)

(58) Field of Classification Search
CPC ............. H04W 74/0833; H04W 24/10; H04W 52/325; H04W 52/36; H04W 4/80;
(Continued)

(56) References Cited

U.S. PATENT DOCUMENTS 10,595,280 B2 * 3/2020 Chen ................... H04W 52/245
2016/0150570 A1 5/2016 Wang et al.
(Continued)

FOREIGN PATENT DOCUMENTS

CN 101877621 A 11/2010
CN 102349329 A 2/2012
(Continued)

OTHER PUBLICATIONS

3GPP TSG-RAN WG2 Meeting #95bis,R2-166323:"NPRACH on Non-anchor NB-IoT Carrier", Huawei, HiSilicon, Neul Ltd. ,Kaohsiung, Oct. 10-14, 2016,total 6 pages.
(Continued)

*Primary Examiner* — Nam T Huynh
(74) *Attorney, Agent, or Firm* — Womble Bond Dickinson (US) LLP (57) ABSTRACT

Embodiments of the present invention relate to the field of communications technologies, and provide a random access method and an apparatus, to resolve a prior-art problem that user equipment cannot accurately select a resource on a non-anchor carrier to perform random access. The method includes: measuring, by user equipment UE in a first measurement period T1, reference signal received power (RSRP) W1 on an anchor carrier; determining, by the UE, a first coverage level based on W1; and determining, by the UE, a first resource based on the first coverage level, where the first resource is used by the UE to perform random access on a non-anchor carrier.

12 Claims, 5 Drawing Sheets

---

UE measures, in a first measurement period T1, reference signal received power (RSRP) W1 on an anchor carrier — 201

The UE determines a first coverage level based on W1, and determines a first resource based on the first coverage level, where the first resource is used by the UE to perform random access on a non-anchor carrier — 202

The UE performs random access on the non-anchor carrier at first transmit power P1 by using the first resource — 203

(51) Int. Cl.
  *H04W 52/32* (2009.01)
  *H04W 52/36* (2009.01)
  *H04W 4/80* (2018.01)
  *H04W 56/00* (2009.01)
  *H04W 52/24* (2009.01)
  *H04W 76/28* (2018.01)

(52) U.S. Cl.
  CPC ....... *H04W 52/242* (2013.01); *H04W 52/325* (2013.01); *H04W 52/36* (2013.01); *H04W 56/001* (2013.01); *H04W 76/28* (2018.02)

(58) Field of Classification Search
  CPC . H04W 56/001; H04W 52/242; H04W 76/28; H04W 52/362; H04W 52/44; H04W 52/367; H04W 52/50; H04W 52/146; H04W 16/32
  See application file for complete search history.

(56) References Cited

U.S. PATENT DOCUMENTS

| | | |
|---|---|---|
| 2016/0286455 A1 | 9/2016 | Zhang et al. |
| 2016/0345308 A1 | 11/2016 | Futaki |
| 2016/0353440 A1 | 12/2016 | Lee et al. |
| 2017/0317740 A1 | 11/2017 | Basu Mallick et al. |
| 2018/0317180 A1* | 11/2018 | Li ................. H04W 52/242 |

FOREIGN PATENT DOCUMENTS

| | | |
|---|---|---|
| CN | 104254135 A | 12/2014 |
| CN | 105916172 A | 8/2016 |
| WO | 2015114694 A1 | 8/2015 |

OTHER PUBLICATIONS

Catt,"Summary of email discussion [94#40] [eNB-IoTenh] RACH on non-anchor carrier",3GPP TSG-RAN WG2 Meeting# 95bis R2-166210,Kaohsiung, Oct. 10-14, 2016,total 21 pages.

3GPP TS 36.213 V14.1.0 (Dec. 2016);3rd Generation Partnership Project;Technical Specification Group Radio Access Network;Evolved Universal Terrestrial Radio Access (E-UTRA);Physical layer procedures(Release 14);total 414 pages.

Institute for Information Industry (III),"Random access procedure on Non-anchor PRB",3GPP TSG-RAN WG2 Meeting#95 R2-165209,Göteborg, Sweden, Aug. 22-26, 2016,total 3 pages.

3GPP TS 36.321 V14.2.0 (Mar. 2017);3rd Generation Partnership Project;Technical Specification Group Radio Access Network;Evolved Universal Terrestrial Radio Access (E-UTRA);Medium Access Control (MAC) protocol specification (Release 14);total 106 pages.

Intel Corporation,"Random access on non-anchor NB-IoT", 3GPP TSG-RAN WG2 #95bis, R2-166681, Kaohsiung, Oct. 10-14, 2016, total 7 pages.

* cited by examiner

RANDOM ACCESS METHOD AND APPARATUS

CROSS-REFERENCE TO RELATED APPLICATIONS

This application is a continuation of International Application No. PCT/CN2017/077941, filed on Mar. 23, 2017, the disclosure of which is herein incorporated by reference in its entirety.

TECHNICAL FIELD

Embodiments of the present invention relate to the field of communications technologies, and in particular, to a random access method and an apparatus.

BACKGROUND

A narrowband Internet of things (NB-IoT) is a technical standard defined by the 3rd Generation Partnership Project (3GPP) protocol standardization organization, and is a narrowband radio frequency technology that is specifically designed for the Internet of things and that features low costs, low power consumption, and wide coverage.

In an NB-IoT system, a system bandwidth for user equipment (UE) is one physical resource block (PRB), and a system bandwidth on a network side may support a plurality of PRB. The plurality of PRBs on the network side may be configured as one or more anchor carriers and a plurality of non-anchor carriers. The UE camps on an anchor carrier when the UE is in an idle mode. A difference between an anchor carrier and a non-anchor carrier in terms of function lies in that the anchor carrier carries system broadcast information and a synchronization signal.

Currently, the UE can initiate random access on an anchor carrier. Specifically, the UE reads system broadcast information and performs narrowband reference signal measurement on the anchor carrier, and initiates random access on the anchor carrier based on a measurement result. The system message may include a plurality of coverage level thresholds.

NB-IoT expansion requirements are increasingly urgent as communication requirements increase. Allowing a terminal to perform random access on only an anchor carrier gradually fails to meet ever increasing communication requirements. Providing random access on a non-anchor carrier has become a relatively urgent requirement. However, information such as a narrowband reference signal is carried only on an anchor carrier. Therefore, how to enable UE to accurately select a resource on a non-anchor carrier to perform random access is a technical issue that needs to be addressed urgently.

SUMMARY

Embodiments of the present invention provide a random access method and an apparatus, to resolve a prior-art problem that UE cannot accurately select a resource on a non-anchor carrier to perform random access.

To achieve the foregoing objective, the embodiments of the present invention use the following technical solutions:

According to a first aspect, a random access method is provided, where the method includes: measuring, by user equipment UE in a first measurement period T1, reference signal received power (RSRP) W1 on an anchor carrier; determining, by the UE, a first coverage level based on W1; and determining, by the UE, a first resource based on the first coverage level, where the first resource is used by the UE to perform random access on a non-anchor carrier. In a first condition: when discontinuous reception (DRX) is not configured for the UE, the first measurement period T1 is greater than 800 milliseconds (ms), for example, T1 is 1000 ms, 1200 ms, 1400 ms, or 1600 ms; or when discontinuous reception is configured for the UE, T1 is greater than five times a discontinuous reception period, for example, T1 is equal to eight times the discontinuous reception period or ten times the discontinuous reception period, where the first condition is that a wireless environment of the UE meets that a signal to interference plus noise ratio of a narrowband synchronization signal is greater than or equal to −6 dB and a signal to interference plus noise ratio of a narrowband reference signal is greater than or equal to −6 dB. Alternatively, in a second condition: when discontinuous reception is not configured for the UE, the first measurement period T1 is greater than 1600 ms, for example, T1 is 2000 ms, 2400 ms, 2800 ms, or 3200 ms; or when discontinuous reception is configured for the UE, T1 is greater than five times a discontinuous reception period, for example, T1 is equal to eight times the discontinuous reception period or ten times the discontinuous reception period, where the second condition is that a wireless environment of the UE meets that a signal to interference plus noise ratio of a narrowband synchronization signal is greater than or equal to −15 dB and a signal to interference plus noise ratio of a narrowband reference signal is greater than or equal to −15 dB. In the foregoing technical solutions, a time for measuring the RSRP may be extended by properly extending a measurement period specified in the prior art, for example, to the value 1000 ms or eight times the discontinuous reception period in different conditions provided above, to further improve precision in measuring the RSRP. The non-anchor carrier is relatively close to the anchor carrier in frequency domain. Therefore, on a premise that the precision in measuring the RSRP on the anchor carrier is improved by the UE, when a result of the measurement is applied to selecting a resource for performing random access on the non-anchor carrier, coverage level selection accuracy is improved, thereby improving resource selection accuracy and further increasing a success rate of performing random access on the non-anchor carrier.

With reference to the first aspect, in a first implementation of the first aspect, the determining, by the UE, a first coverage level based on W1 includes: determining, by the UE, the first coverage level based on a result of comparing W1 with at least one coverage level threshold, where the at least one coverage level threshold is received by the UE from an access network device, or the at least one coverage level threshold is determined by the UE based on at least one coverage level threshold received from an access network device and an incremental value, where the incremental value is preconfigured. Optionally, the incremental value is 0.5*M, and M is a positive integer greater than or equal to 1. In the foregoing implementation, when the at least one coverage level threshold is determined based on the at least one coverage level threshold received from the access network device and the incremental value, the incremental value herein is set to increase a coverage level threshold when random access is performed on the non-anchor carrier. Relative to random access on the anchor carrier, this enables the UE to predict a coverage environment of the UE as accurately as possible and select a corresponding resource suitable for a lower coverage level, to improve coverage level selection accuracy, thereby improving resource selection accuracy and further increasing the success rate of performing random access on the non-anchor carrier.

With reference to the first aspect or the first implementation of the first aspect, in a second implementation of the first aspect, the method further includes: performing, by the UE, random access on the non-anchor carrier at first transmit power P1 by using the first resource, where P1 is transmit power at which the UE sends, at a minimum quantity of repetitions, a narrowband preamble for the random access, P1 is a smaller value of maximum transmit power Pmax and second transmit power P2, Pmax is maximum transmit power configured by a network, P2 is obtained by adding a power increment $\Delta P$ to a sum of expected receive power Ph and an estimated downlink path loss PL, Ph is expected narrowband preamble receive power configured by the network, PL is a downlink path loss that is of a serving cell accessed by the UE and that is estimated by the UE, and $\Delta P$ is a positive value. Optionally, $\Delta P$ is 0.5*N, and N is a positive integer greater than or equal to 1.

In the foregoing implementation, when the UE performs random access on the non-anchor carrier, the UE increases transmit power used by the UE to send the narrowband preamble for the random access, to increase a received signal to interference plus noise ratio of a signal at the access network device, thereby increasing the success rate of performing, by the UE, random access on the non-anchor carrier.

According to a second aspect, a random access method is provided, wherein the method includes: measuring, by UE in a first measurement period T1, reference signal received power (RSRP) W1 on an anchor carrier; and determining, by the UE, a first coverage level based on a result of comparing W1 with at least one coverage level threshold, where the at least one coverage level threshold is received by the UE from an access network device, or the at least one coverage level threshold is determined by the UE based on at least one coverage level threshold received from an access network device and an incremental value, where the incremental value is preconfigured. Optionally, the incremental value is 0.5*M, and M is a positive integer greater than or equal to 1.

According to a third aspect, a random access method is provided, where the method includes: measuring, by UE in a first measurement period T1, reference signal received power (RSRP) W1 on an anchor carrier; determining, by the UE, a first coverage level based on W1; determining, by the UE, a first resource based on the first coverage level; and performing, by the UE, random access on a non-anchor carrier at first transmit power P1 by using the first resource, where P1 is transmit power at which the UE sends, at a minimum quantity of repetitions, a narrowband preamble for the random access, P1 is a smaller value of maximum transmit power Pmax and second transmit power P2, Pmax is maximum transmit power configured by a network, P2 is obtained by adding a power increment $\Delta P$ to a sum of expected receive power Ph and an estimated downlink path loss PL, Ph is expected narrowband preamble receive power configured by the network, PL is a downlink path loss that is of a serving cell accessed by the UE and that is estimated by the UE, and $\Delta P$ is a positive value. Optionally, $\Delta P$ is 0.5*N, and N is a positive integer greater than or equal to 1.

According to a fourth aspect, user equipment is provided, where the user equipment includes: a measurement unit, configured to measure, in a first measurement period T1, reference signal received power (RSRP) W1 on an anchor carrier; and a determining unit, configured to determine a first coverage level based on W1, where the determining unit is further configured to determine a first resource based on the first coverage level, where the first resource is used by the UE to perform random access on a non-anchor carrier.

With reference to the fourth aspect, in a first implementation of the fourth aspect, in a first condition: when discontinuous reception (DRX) is not configured for the user equipment, the first measurement period T1 is 1000 milliseconds, 1200 milliseconds, 1400 milliseconds, or 1600 milliseconds; or when discontinuous reception is configured for the user equipment, T1 is equal to eight times a discontinuous reception period or ten times a discontinuous reception period, where the first condition is that a wireless environment of the user equipment meets that a signal to interference plus noise ratio of a narrowband synchronization signal is greater than or equal to −6 dB and a signal to interference plus noise ratio of a narrowband reference signal is greater than or equal to −6 dB. Alternatively, in a second condition: when discontinuous reception is not configured for the user equipment, the first measurement period T1 is 2000 milliseconds, 2400 milliseconds, 2800 milliseconds, or 3200 milliseconds; or when discontinuous reception is configured for the user equipment, T1 is equal to eight times a discontinuous reception period or ten times a discontinuous reception period, where the second condition is that a wireless environment of the user equipment meets that a signal to interference plus noise ratio of a narrowband synchronization signal is greater than or equal to −15 dB and a signal to interference plus noise ratio of a narrowband reference signal is greater than or equal to −15 dB.

With reference to the fourth aspect or the first implementation of the fourth aspect, in a second implementation of the fourth aspect, the determining unit is specifically configured to: determine the first coverage level based on a result of comparing W1 with at least one coverage level threshold, where the at least one coverage level threshold is received by the user equipment from an access network device, or the at least one coverage level threshold is determined by the user equipment based on at least one coverage level threshold received from an access network device and an incremental value, where the incremental value is preconfigured. Optionally, the incremental value is 0.5*M, and M is a positive integer greater than or equal to 1.

With reference to any one of the fourth aspect or the first and the second implementations of the fourth aspect, in a third implementation of the fourth aspect, the user equipment further includes an access unit, configured to perform random access on the non-anchor carrier at first transmit power P1 by using the first resource, where P1 is transmit power at which the user equipment sends, at a minimum quantity of repetitions, a narrowband preamble for the random access, P1 is a smaller value of maximum transmit power Pmax and second transmit power P2, Pmax is maximum transmit power configured by a network, P2 is obtained by adding a power increment $\Delta P$ to a sum of expected receive power Ph and an estimated downlink path loss PL, Ph is expected narrowband preamble receive power configured by the network, PL is a downlink path loss that is of a serving cell accessed by the user equipment and that is estimated by the user equipment, and $\Delta P$ is a positive value.

With reference to any one of the third implementation of the fourth aspect, in a fourth implementation of the fourth aspect, $\Delta P$ is 0.5*N, and N is a positive integer greater than or equal to 1.

According to a fifth aspect, user equipment is provided, where the user equipment includes a memory and a processor, the memory stores code and data, and the processor executes the code in the memory to enable the user equipment to perform the random access method according to any one of the first aspect or the first and the second implementations of the first aspect, enable the user equipment to perform the random access method according to the second aspect, or enable the user equipment to perform the random access method according to the third aspect.

Still another aspect of this application provides a computer readable storage medium, where the computer readable storage medium stores an instruction, and when the instruction runs on a computer, the computer is enabled to perform the random access method according to the foregoing aspects.

Still another aspect of this application provides a computer program product that includes an instruction. When the computer program product runs on a computer, the computer is enabled to perform the random access method according to the foregoing aspects.

It can be understood that any of the apparatus, computer storage medium, or computer program product provided above is used to perform the corresponding method provided above. Therefore, for beneficial effects of the apparatus, the computer storage medium, or the computer program product, refer to the beneficial effects in the corresponding method provided above. Details are not described herein again.

DESCRIPTION OF EMBODIMENTS

Figure 1:
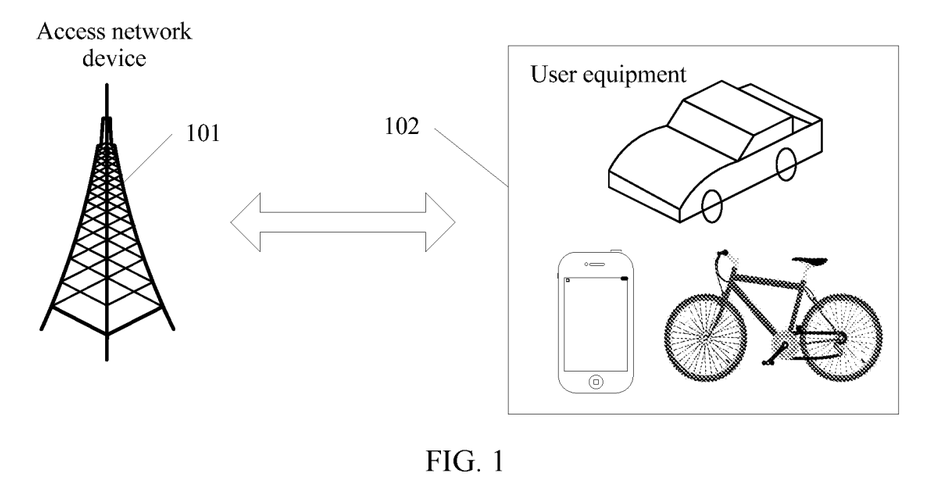
FIG. 1 is a schematic structural diagram of an NB-IoT system according to an embodiment of the present invention.

FIG. 1 is a schematic structural diagram of an NB-IoT system according to an embodiment of the present invention. An NB-IoT provides a cellular data connection to a low power device in a wide area network, and may also be referred to as a low power wide area network (LPWAN). The NB-IoT is constructed on a cellular network and consumes only a bandwidth not greater than 180 kHz (that is, one PRB), and may be deployed directly on a GSM network, a UMTS network, or an LTE network, to reduce deployment costs and implements smooth upgrade.

Referring to FIG. 1, the NB-IoT system may include an access network device 101 and user equipment 102. The access network device 101 may be a base station, and provides a shared channel scheduling function and a function of setting up scheduling based on a history of packet data sent to the user equipment 102. Scheduling is a mechanism used to effectively allocate a physical layer resource when a plurality of user equipments 102 share a transmission resource, to obtain a statistical multiplexing gain. The user equipment 102 sends and receives data by setting up a communication channel to the access network device 101. The user equipment 102 sends or receives a shared channel based on information sent by using a scheduling control channel. In addition, the user equipment 102 may be a mobile phone, a vehicle, a computer, a portable terminal, or the like. In addition, types of the user equipments 102 may be the same or may be different. The access network device 101 and the user equipment 102 receive and send data with each other by using the communication channel. The communication channel may be a wireless communication channel. The wireless communication channel includes at least a shared channel and a scheduling control channel. The shared channel is shared between the plurality of user equipments 102 and is used to send and receive a packet. The scheduling control channel is used to send a shared channel allocation, a corresponding scheduling result, and the like.

Figure 2:
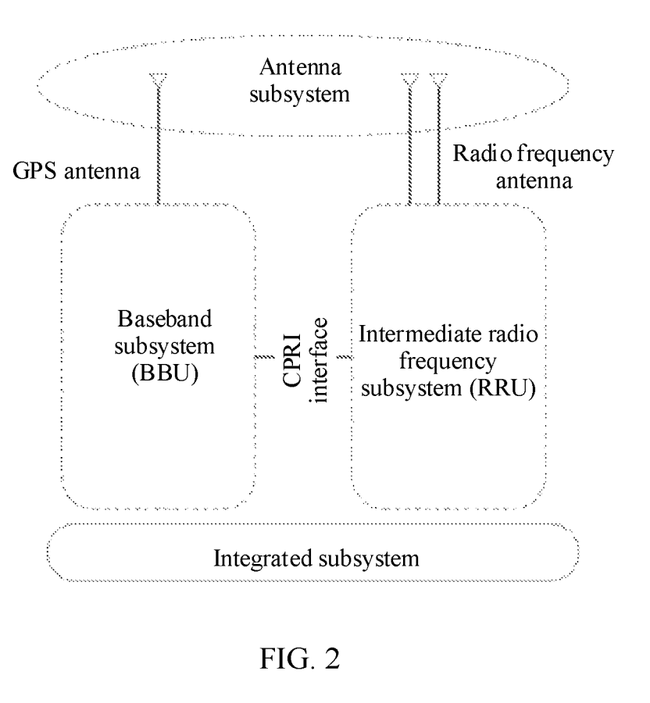
FIG. 2 is a schematic structural diagram of an access network device according to an embodiment of the present invention.

FIG. 2 is a structural diagram of hardware of an access network device according to an embodiment of the present invention. As shown in FIG. 2, the access network device may be a base station, and includes a baseband subsystem, an intermediate radio frequency subsystem, an antenna subsystem, and some support structures (for example, an integrated subsystem). The baseband subsystem is configured to implement operation and maintenance of the entire base station, implement signaling processing and a radio resource management, provide a transmission interface to a packet core network, and control a physical layer, a media access control layer, L3 signaling, and operation and maintenance in LTE. The intermediate radio frequency subsystem implements conversion between a baseband signal, an intermediate frequency signal, and a radio frequency signal, demodulates an LTE wireless received signal, modulates a sent signal, and amplifies power of the sent signal. The antenna subsystem includes an antenna and a feeder that are connected to a radio frequency module of the base station and an antenna and a feeder that are connected to a GPS receiving card, and is configured to receive and send a wireless air interface signal. The integrated subsystem supports the baseband subsystem and the intermediate subsystem, and provides a structure, power supply, and an environment monitoring function.

Figure 3:
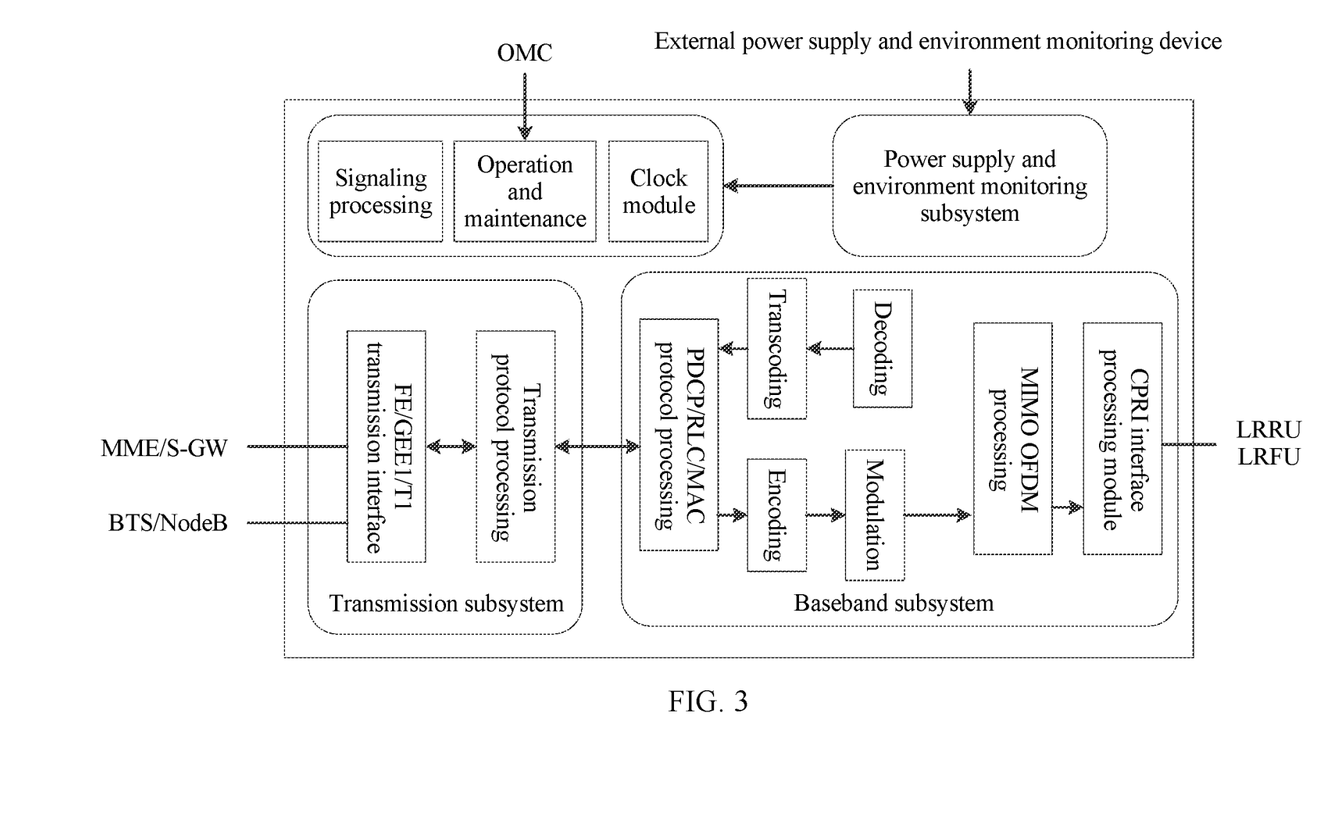
FIG. 3 is a schematic structural diagram of a baseband subsystem according to an embodiment of the present invention.

The baseband subsystem may be shown in FIG. 3. For example, to surf the Internet, a mobile phone needs to access a core network via a base station and access the Internet via the core network. Data of the Internet is transmitted to a baseband portion through an interface between the core network and the base station. The data undergoes processing such as PDCP, RLC, and MAC protocol processing, encoding, and modulation on the baseband portion, and then is delivered to a radio frequency portion to transmit to mobile phone. A baseband and a radio frequency may be connected to each other by using a CPRI interface. In addition, currently, the radio frequency portion may be deployed remotely by using an optical fiber. For example, the radio frequency portion may be a remotely deployed RRU. Operations of a data transmission method in the embodiments of the present invention may be performed by the baseband portion by using the radio frequency. In addition, receiving and sending operations are implemented by using an antenna (for example, an air interface).

An interface between user equipment and a base station in the embodiments of the present invention may be understood as an air interface used by the user equipment and the base station to communicate with each other, or may be referred to as a Uu interface.

Figure 4:
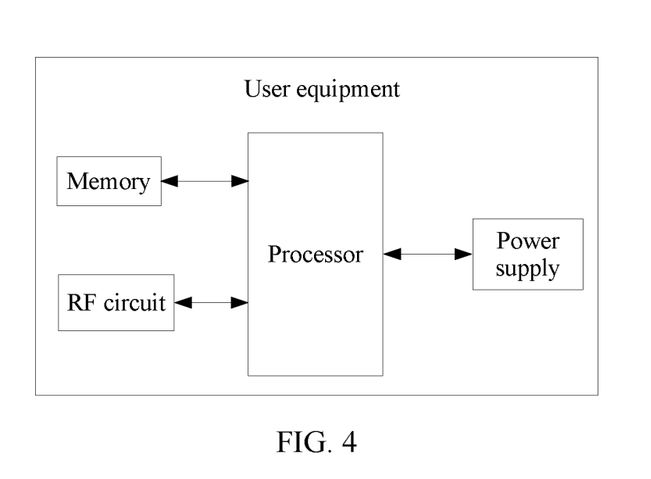
FIG. 4 is a schematic structural diagram of user equipment according to an embodiment of the present invention.

FIG. 4 is a schematic structural diagram of user equipment to which an embodiment of the present invention is applied. The user equipment may be a vehicle, a mobile phone, a tablet computer, a notebook computer, or the like. In this embodiment of the present invention, descriptions are provided by using an example in which the user equipment is a mobile phone. FIG. 4 is a block diagram of a partial structure of the mobile phone that is related to the embodiments of the present invention.

As shown in FIG. 4, the user equipment includes components such as a memory, a processor, a radio frequency (RF) circuit, and a power supply. A person skilled in the art can understand that the structure shown in FIG. 4 does not constitute a limitation to the user equipment, and the user equipment may include more or fewer components than those shown in the figure, or combine some components, or have a different component arrangement.

The following describes in detail the components of the user equipment with reference to FIG. 4.

The memory may be configured to store a software program and a module. The processor runs the software program and the module stored in the memory to perform various functions and applications of the user equipment and perform data processing. The memory may mainly include a program storage area and a data storage area. The program storage area may store an operating system, an application program needed by at least one function, and the like. The data storage area may store data created based on use of the user equipment, and the like. In addition, the memory may include a high-speed random access memory, and may further include a nonvolatile memory and the like.

The processor is a control center of the user equipment, and connects different parts of the entire user equipment by using various interfaces and lines. The processor performs various functions of the user equipment and processes data by running or executing the software program and/or the module stored in the memory and by invoking the data in the memory, thereby implementing overall monitoring of the user equipment. Optionally, the processor may include one or more processing units. Preferably, the processor may integrate an application processor and a modem processor. The application processor mainly processes an operating system, a user interface, an application program, and the like. The modem processor mainly processes wireless communication.

The radio frequency (RF) circuit may be configured to receive and send a signal in an information receiving and sending process or a calling process. Usually, the RF circuit includes but is not limited to an antenna, at least one amplifier, a transceiver, a coupler, a low noise amplifier, a duplexer, and the like. In addition, the RF circuit may further communicate with a network and another device by using wireless communication. The wireless communication may use any communications standard or protocol, including but not limited to a global system for mobile communications, a general packet radio service, code division multiple access, wideband code division multiple access, long term evolution, email, a short message service, and the like.

The user equipment may further include a power supply that supplies power to each part. Preferably, the power supply may be logically connected to the processor by using a power management system, to implement functions such as charging, discharging, and power consumption management by using the power management system.

Although not illustrated, the user equipment may further include an input unit, a display unit, a sensor module, an audio module, a WiFi module, a Bluetooth module, and the like. Details are not described herein.

When the user equipment (UE) needs to perform random access, the UE first needs to select a resource, to perform random access on the selected resource. Whether an access resource is accurately and properly selected greatly affects a success rate of performing random access by the UE. Because a system message and a synchronization signal are carried on an anchor carrier, in the prior art, the UE measures a narrowband reference signal received power (NRSRP) on the anchor carrier; determines, based on the NRSRP, a coverage status of an environment in which the UE is located; and selects a proper resource to perform access on the anchor carrier. A manner in which the UE detects the anchor carrier has been disclosed in the prior art. For example, the UE may detect the anchor carrier by using cell identification or cell search. In this embodiment of the present invention, the UE measures the narrowband reference signal received power on the anchor carrier, but sending of a narrowband reference signal is not specifically limited.

However, when the UE needs to initiate random access on a non-anchor carrier, the UE also needs to determine, by comparing the narrowband reference signal received power measured on the anchor carrier and a coverage level threshold read from the system message, a target coverage level of the UE, thereby selecting, based on the coverage level, a resource used for random access and initiating random access on the resource. Because uplink quality of the anchor carrier is not completely equivalent to uplink quality of the non-anchor carrier, and measurement precision of UE in an NB-IoT system is relatively poor, if random access is performed on the non-anchor carrier completely according to a method and a parameter (for example, a coverage level threshold, a measurement period (800 ms/1600 ms), and/or transmit power) used for performing random access on the anchor carrier, when random access is performed on the non-anchor carrier, the UE cannot accurately select a random access resource. As a result, a success rate of random access is relatively low. A method provided in the embodiments of the present invention is improved based on the method for performing, by UE, random access on an anchor carrier, so that the UE can select a resource as accurately as possible, thereby increasing the success rate of performing random access on the non-anchor carrier.

Figure 5:
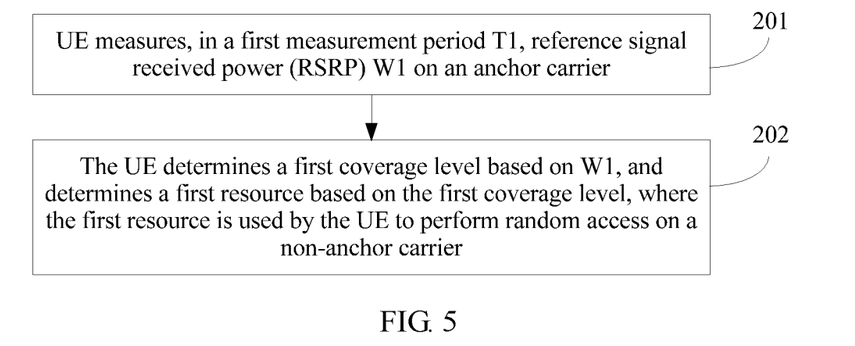
FIG. 5 is a flowchart of a random access method according to an embodiment of the present invention.

FIG. 5 is a flowchart of a random access method according to an embodiment of the present invention. The random access method is applied to the user equipment UE in the NB-IoT system shown in FIG. 1. Referring to FIG. 5, the method includes the following several operations.

In operation 201, UE measures, in a first measurement period T1, reference signal received power (RSRP) W1 on an anchor carrier.

Carriers in the NB-IoT system may be divided into two categories, which are respectively an anchor carrier and a non-anchor carrier. The anchor carrier is a carrier that provides a narrowband primary synchronization signal (NPSS) and a narrowband secondary synchronization signal (NSSS) and that carries a narrowband physical broadcast channel (NPBCH) and system information. In addition, the UE may detect the anchor carrier by using a method such as cell identification or cell search. A carrier in the carriers in the NB-IoT system other than the anchor carrier is referred to as a non-anchor carrier.

In addition, in this embodiment of the present invention, the reference signal received power RSRP is narrowband reference signal received power (NRSRP), measured by the UE on the anchor carrier, of a narrowband reference signal (NRS).

In this embodiment of the present invention, the first measurement period T1 is a preset measurement period. The UE measures the NRSRP based on the preset measurement period. Optionally, T1 may be specified in a standard or a protocol, or may be notified by an access network device to the UE in advance. Using T1 specified in the standard or the protocol can reduce signaling, thereby improving communication efficiency.

Specifically, a value corresponding to the first measurement period T1 varies with different conditions. In the following, different conditions of the first measurement period T1 may be divided into two conditions based on a wireless environment of the UE. Details are described below. The wireless environment of the UE may be described based on a signal to interference plus noise ratio of a narrowband synchronization signal and a signal to interference plus noise ratio of a narrowband reference signal.

A first condition is that the wireless environment of the UE meets that the signal to interference plus noise ratio of the narrowband synchronization signal is greater than or equal to −6 dB and the signal to interference plus noise ratio of the narrowband reference signal is greater than or equal to −6 dB.

In the first condition, if discontinuous reception (DRX) is not configured for the UE, the first measurement period T1 is greater than 800 milliseconds (ms), for example, T1 may be equal to 1000 ms, 1200 ms, 1400 ms, 1600 ms, or the like; or if discontinuous reception is configured for the UE, the first measurement period T1 is equal to eight times a discontinuous reception period or ten times a discontinuous reception period. It should be noted herein that in the prior art, in the first condition, if discontinuous reception is not configured for the UE, the first measurement period T1 in which the UE measures the reference signal received power is 800 ms; or if discontinuous reception is configured for the UE, the first measurement period T1 is equal to five times the discontinuous reception period.

A second condition is that the wireless environment of the UE meets that the signal to interference plus noise ratio of the narrowband synchronization signal is greater than or equal to −15 dB and the signal to interference plus noise ratio of the narrowband reference signal is greater than or equal to −15 dB. It should be noted herein that because it has been limited in the first condition that the signal to interference plus noise ratio of the narrowband synchronization signal is greater than or equal to −6 dB and the signal to interference plus noise ratio of the narrowband reference signal is greater than or equal to −6 dB, the foregoing description of the second condition should be construed as meeting that the signal to interference plus noise ratio of the narrowband synchronization signal is less than −6 dB and the signal to interference plus noise ratio of the narrowband reference signal is less than −6 dB, so that the second condition does not overlap with the first condition, thereby avoiding a conflict.

In the second condition, if discontinuous reception is not configured for the UE, the first measurement period T1 is greater than 1600 ms, for example, T1 may be equal to 2000 ms, 2400 ms, 2800 ms, 3200 ms, or the like; or if discontinuous reception is configured for the UE, the first measurement period T1 is equal to eight times a discontinuous reception period or ten times a discontinuous reception period. In the prior art, in the second condition, if discontinuous reception is not configured for the UE, the first measurement period T1 is 1600 ms; or if discontinuous reception is configured for the UE, the first measurement period T1 is equal to five times the discontinuous reception period.

It should be noted that discontinuous reception means that the UE performs receiving intermittently. To be specific, after the UE performs receiving for a specified segment of time, the UE sleeps for a specified segment of time, and then continues to perform receiving for a specified segment of time and then sleeps for a specified segment of time, and so on. The discontinuous reception period includes the specified segment of time in which the UE performs receiving and the specific segment of time in which the UE sleeps. It should be further noted that for a specific value of the discontinuous reception period, reference may be made to a value specified by the access network device in a corresponding communication scenario. The present invention sets no specific limitation.

In addition, a signal to interference plus noise ratio of a signal is a ratio of a measured strength of a wanted signal of the signal to a measured strength of an interference signal. The interference signal includes interference and noise. The interference includes interference from other cells in a current system and interference from a different system, and the noise is related to a bandwidth of the signal and a noise coefficient of the UE.

When the UE measures the reference signal received power W1 based on the first measurement period T1 specified in this embodiment of the present invention, precision in measuring the reference signal received power by the UE can be improved, so that accuracy in determining a coverage level and selecting a random access resource by the UE based on W1 can be improved, thereby increasing a success rate of performing, by the UE, random access on the non-anchor carrier.

For example, in the first condition, when discontinuous reception is not configured for the UE, a time for measuring the RSRP may be extended by properly extending a measurement period of 800 ms or five times the discontinuous reception period specified in the prior art, for example, to the value 1000 ms or eight times the discontinuous reception period in different conditions provided above, to further improve precision in measuring the RSRP. The non-anchor carrier is relatively close to the anchor carrier in frequency domain. Therefore, on a premise that the precision in measuring the RSRP on the anchor carrier is improved by the UE, when a result of the measurement is applied to selecting a resource for performing random access on the non-anchor carrier, coverage level selection accuracy is improved, thereby improving resource selection accuracy and further increasing the success rate of performing random access on the non-anchor carrier. It is learned through tests and analysis that an extended measurement period also increases specific power consumption while increasing the success rate of random access relative to the prior art. However, the measurement period is extended within a limit, for example, to a value provided above in this embodiment of the present invention. This reduces power consumption caused by re-access or retransmission resulted from a random access failure. Therefore, relative to a measurement period configuration in the prior art, the method provided in this embodiment of the present invention can increase the success rate of performing random access on the non-anchor carrier without increasing overall power consumption.

202. The UE determines a first coverage level based on W1, and determines a first resource based on the first coverage level, where the first resource is used by the UE to perform random access on a non-anchor carrier.

Specifically, the UE determines a first coverage level based on a result of comparing W1 with at least one coverage level threshold. The at least one coverage level threshold may be received by the UE from the access network device. Alternatively, an incremental value may be preconfigured, and the UE determines, based on at least one coverage level threshold received from the access network device and the incremental value, the at least one coverage level threshold to be compared with W1, where the preconfigured incremental value may be specified by a standard or a protocol. For example, each of the at least one coverage level threshold received from the access network device is increased by the incremental value, to obtain at least one new coverage level threshold, and the at least one new coverage level threshold is compared with W1. Optionally, the incremental value may be 0.5*M, and M is a positive integer greater than or equal to 1. In other words, the incremental value is an integer multiple of 0.5 dB, for example, 0.5 dB, 1 dB, or 1.5 dB. This embodiment of the present invention sets no limitation thereto.

Further optionally, a set may be predefined in a standard or a protocol. The set includes a plurality of thresholds. The access network device may determine at least one threshold from the plurality of thresholds as a coverage level threshold, and send the determined coverage level threshold to the UE. For example, the set may be [−140, −44] dBm, and a step is 1 dB. To be specific, the set includes −140, −44, and all integers between −140 and −44. The at least one threshold determined by the access network device may be −120 dBm and −20 dBm.

Figure 6:
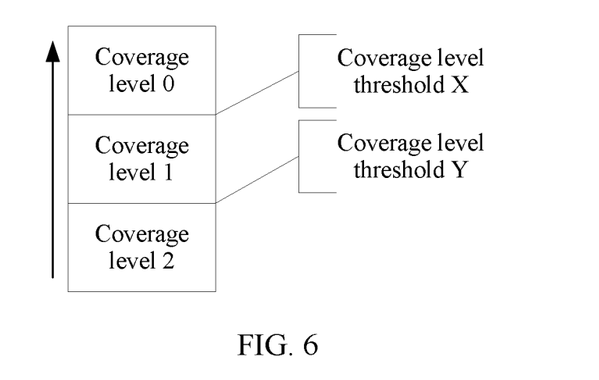
FIG. 6 is a schematic diagram of a type of coverage level distribution according to an embodiment of the present invention.

For example, as shown in FIG. 6, if the at least one coverage level threshold is received from the access network device, the at least one coverage level threshold includes X and Y, and X>Y. Then, three coverage levels may be obtained through division based on the coverage level thresholds X and Y. A coverage level greater than or equal to X is determined as a coverage level 0, a coverage level greater than or equal to Y and less than X is determined as a coverage level 1, and a coverage level less than Y is determined as a coverage level 2. If W1 is equal to X or greater than X, the first coverage level is the coverage level 0; if W1 is equal to Y or greater than Y and less than X, it is determined that the first coverage level is the coverage level 1; or if W1 is less than Y, it is determined that the first coverage level is the coverage level 2.

Figure 7:
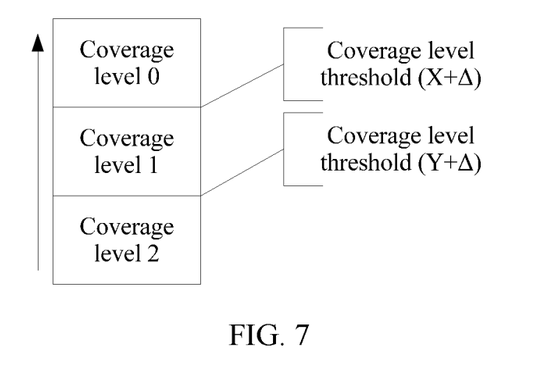
FIG. 7 is a schematic diagram of another type of coverage level distribution according to an embodiment of the present invention.

For another example, as shown in FIG. 7, if the at least one coverage level threshold is determined by the UE based on the at least one coverage level threshold received from the access network device and the incremental value, the received at least one coverage level threshold includes X and Y, X>Y, and the incremental value is Δ. Then, three coverage levels may be obtained through division based on X and Y. A coverage level greater than or equal to (X+Δ) is determined as a coverage level 0, a coverage level greater than or equal to (Y+Δ) and less than (X+Δ) is determined as a coverage level 1, and a coverage level less than (Y+Δ) is determined as a coverage level 2. If W1 is equal to (X+Δ) or greater than (X+Δ), it is determined that the first coverage level is the coverage level 0; if W1 is equal to (Y+Δ) or greater than (Y+Δ) and less than (X+Δ), it is determined that the first coverage level is the coverage level 1; or if W1 is less than (Y+Δ), it is determined that the first coverage level is the coverage level 2.

After the UE determines the first coverage level based on W1, the UE may determine, based on a size of a time-frequency resource corresponding to the first coverage level, the first resource that is used to perform random access on the non-anchor carrier.

It should be noted that in this embodiment of the present invention, when the at least one coverage level threshold is determined based on the at least one coverage level threshold received from the access network device and the incremental value, although the anchor carrier is relatively close to the non-anchor carrier in frequency domain, a difference still exists. Certainly, a specific error also exists when a result of measuring the RSRP on the anchor carrier is used to determine a coverage level for the UE during random access on the non-anchor carrier. In this embodiment of the present invention, the incremental value is set to increase a coverage level threshold when random access is performed on the non-anchor carrier. Relative to random access on the anchor carrier, this enables the UE to predict a coverage environment of the UE as accurately as possible and select a corresponding resource suitable for a lower coverage level, to improve coverage level selection accuracy, thereby improving resource selection accuracy and further increasing the success rate of performing random access on the non-anchor carrier. It is learned through tests and analysis that an increased coverage level threshold also requires more resources relative to the prior art, and more resources are consumed while the success rate of random access is increased. However, the threshold is increased properly, for example, to a value provided above in this embodiment of the present invention. This reduces power consumption and more required resources caused by re-access or re-transmission resulted from a random access failure. Therefore, relative to a coverage level threshold setting in the prior art, the method provided in this embodiment of the present invention can increase the success rate of performing random access on the non-anchor carrier without increasing overall power consumption and an overall resource requirement.

Figure 8:
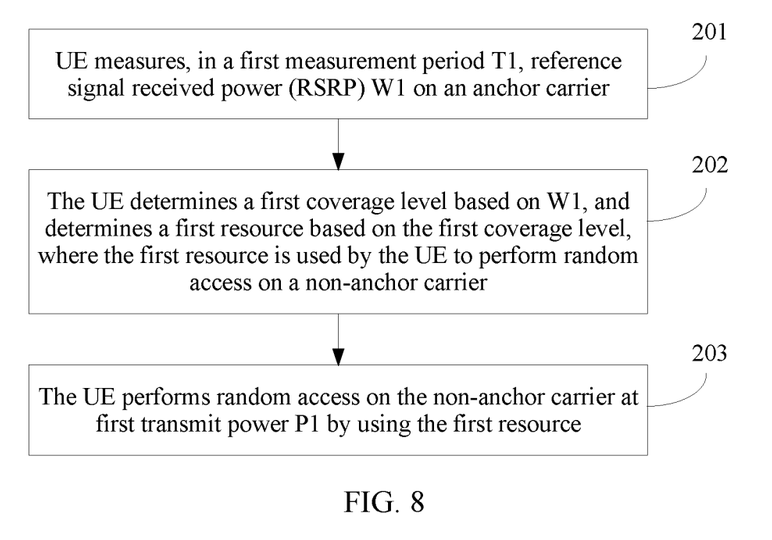
FIG. 8 is a flowchart of another random access method according to an embodiment of the present invention.

Further, referring to FIG. 8, the method further includes operation 203.

In operation 203, the UE performs random access on the non-anchor carrier at first transmit power P1 by using the first resource, where the first transmit power P1 is transmit power at which the UE sends, at a minimum quantity of repetitions, a narrowband preamble for the random access, P1 is a smaller value of maximum transmit power Pmax and second transmit power P2, the maximum transmit power Pmax is maximum transmit power configured by a network, the second transmit power P2 is obtained by adding a power increment ΔP to a sum of expected receive power Ph and an estimated downlink path loss PL, Ph is expected narrowband preamble receive power configured by the network, PL is a downlink path loss that is of a serving cell accessed by the UE and that is estimated by the UE, and ΔP is a positive value.

When the UE performs random access by using the first resource, the UE may send, based on a quantity of repetitions configured in the system message, a narrowband preamble for random access, where the quantity of repetitions includes the minimum quantity of repetitions and other quantities of repetitions except the minimum quantity of repetitions. When the UE sends, at different quantities of repetitions, the narrowband preamble for random access, transmit power used by the UE is different. Specifically, if the UE sends the narrowband preamble at a quantity of repetitions except the minimum quantity of repetitions, the UE sends the narrowband preamble at the maximum transmit power Pmax; if the UE sends the narrowband preamble at the minimum quantity of repetitions, the UE sends the narrowband preamble at the first transmit power P1. That the UE performs random access at first transmit power P1 by using the first resource means that the UE sends the narrowband preamble at the minimum quantity of repetitions, to perform random access.

Specifically, when the UE sends, at the minimum quantity of repetitions, the narrowband preamble for random access, the UE sends the narrowband preamble at the first transmit power P1, where P1 may be determined based on Formula (1) below. In the formula, min represents that a minimum value is selected.

$$P1 = \min \begin{cases} P\max \\ P2 = Ph + PL + \Delta P \end{cases} \quad (1)$$

In an embodiment of the present invention, $\Delta P$ is 0.5*N, and N is a positive integer greater than or equal to 1. For example, N may be 1, 2, 3, or the like. Then, $\Delta P$ may be 0.5 dB, 1 dB, 1.5 dB, or the like. This embodiment of the present invention sets no limitation thereto.

It should be noted herein that although the anchor carrier is relatively close to the non-anchor carrier in frequency domain, a specific error certainly exists in coverage level determining when the result of measuring the RSRP on the anchor carrier by the UE is used to determine the coverage level for random access on the non-anchor carrier and select a resource to perform random access. The UE may fail to perform random access on the non-anchor carrier due to such an error, triggering subsequent re-access or re-transmission. In the method provided in this embodiment of the present invention, because the increment $\Delta P$ is set, transmit power of the UE can be properly increased, thereby increasing the success rate of performing, by the UE, random access on the non-anchor carrier. Similarly, the increased transmit power increases power consumption of the UE relative to the prior art, but power consumption caused by re-access or re-transmission resulted from a random access failure is also reduced.

Therefore, when the UE performs random on the non-anchor carrier, in this embodiment of the present invention, transmit power used by the UE to send the narrowband preamble is increased, to increase a received signal to interference plus noise ratio of a signal at the access network device, thereby increasing the success rate of performing, by the UE, random access on the non-anchor carrier.

It should be noted that operation 201 to operation 203 in this embodiment of the present invention separately provide a method for increasing the success rate of random access. The methods in the three operations may be used independently or may be combined. This embodiment of the present invention sets no specific limitation thereto.

In the random access method provided in this embodiment of the present invention, the UE measures, in the first measurement period T1 the reference signal received power W1, where T1 is a measurement period properly extended relative to a measurement period configured in the prior art. Therefore, precision in measuring W1 is relatively high. Then, the UE determines the first coverage level based on W1 and the at least one coverage level. When the at least one coverage level is obtained based on the at least one coverage level threshold sent by the access network device and the incremental value, accuracy in determining the first coverage level by the UE can be improved, thereby improving accuracy in selecting the first resource. Finally, the UE performs random access at the first transmit power by using the first resource, to increase a received signal to interference plus noise ratio of the access network device. Therefore, in this embodiment of the present invention, the success rate of performing, by the UE, random access on the non-anchor carrier is increased by using the method of improving the precision in measuring W1, the method of improving the accuracy in selecting the first resource, and the method of increasing the received signal to interference plus noise ratio of the access network device.

The foregoing mainly describes the solutions provided in the embodiments of the present invention from a perspective of interaction between the network elements. It can be understood that, to implement the foregoing functions, the network elements, such as the user equipment and the access network device, include a corresponding hardware structure and/or software module for performing each of the functions. A person of ordinary skill in the art should easily be aware that, network elements and algorithm operations in the examples described with reference to the embodiments disclosed in this specification may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, function modules of the user equipment may be divided based on the foregoing method example. For example, each function module may be divided according to each function, or two or more functions may be integrated into one processing module. The integrated module may be implemented in a form of hardware, or may be implemented in a form of a software function module. It should be noted that, in this embodiment of the present invention, module division is an example, and is merely a logical function division. In actual implementation, another division manner may be used.

Figure 9:
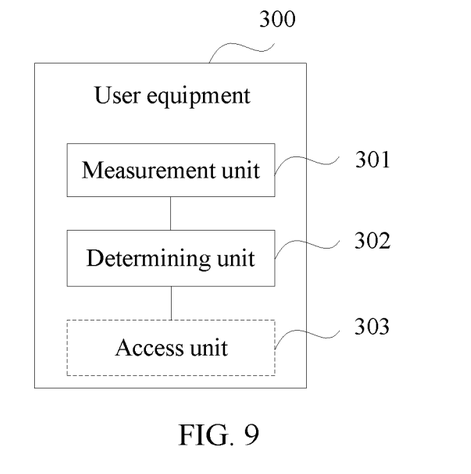
FIG. 9 is a schematic structural diagram of user equipment according to an embodiment of the present invention.

When each function module is divided according to each function, FIG. 9 is a schematic structural diagram of user equipment 300 in the foregoing embodiments. User equipment 300 includes a measurement unit 301 and a determining unit 302. The measurement unit 301 is configured to perform operation 201 in FIG. 5 or FIG. 8, and the determining unit 302 is configured to perform operation 202 in FIG. 5 or FIG. 8. Further, the user equipment 300 further includes an access unit 303, where the access unit 303 is configured to perform operation 203 in FIG. 8. All related content of each operation in the foregoing method embodiments may be cited in function descriptions of a corresponding function module. Details are not described herein again.

In hardware implementation, the measurement unit 301 and the determining unit 302 may be a processor, and the access unit 303 may be a transmitter, where the transmitter and a receiver constitute a transceiver.

Figure 10:
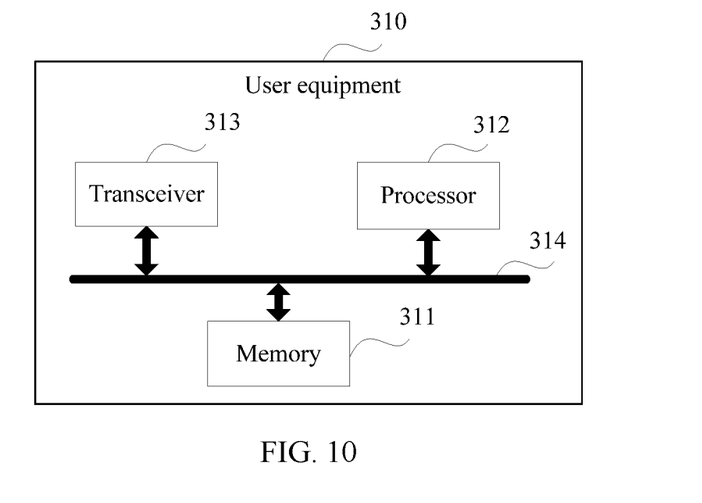
FIG. 10 is a schematic structural diagram of another user equipment according to an embodiment of the present invention.

FIG. 10 is a schematic diagram of a logical structure of user equipment 310 in the foregoing embodiments according to an embodiment of the present invention. The user equipment 310 includes a processor 312, a transceiver 313, a memory 311, and a bus 314. The processor 312, the transceiver 313, and the memory 311 are connected to each other by using the bus 314. In this embodiment of the present invention, the processor 312 is configured to control and manage an action of the user equipment 310. For example, the processor 312 is configured to perform operation 201 and operation 202 in FIG. 5 or FIG. 8 and/or configured to perform another process of the technology described in this specification. The transceiver 313 is configured to support the user equipment 310 in communication. The memory 311 is configured to store program code and data of the user equipment 310.

The processor 312 may be a central processing unit, a general-purpose processor, a digital signal processor, an application-specific integrated circuit, a field programmable gate array or another programmable logical device, a transistor logical device, a hardware component, or any combination thereof. The processor 312 may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 314 may be a peripheral component interconnect (PCI) bus, an extended industry standard architecture (EISA) bus, and the like. The bus may be classified into an address bus, a data bus, a control bus, and the like. For ease of representation, only one bold line is used to represent the bus in FIG. 10, but this does not mean that there is only one bus or only one type of bus.

In another embodiment of the present invention, a computer readable storage medium is further provided. The computer readable storage medium stores a computer executable instruction. When at least one processor of a device executes the computer executable instruction, the device performs the random access method provided in FIG. 5 or FIG. 8.

In another embodiment of the present invention, a computer program product is further provided. The computer program product includes a computer executable instruction. The computer executable instruction is stored in a computer readable storage medium. At least one processor of a device may read the computer executable instruction from the computer readable storage medium. The at least one processor executes the computer executable instruction to enable the device to perform the random access method provided in FIG. 5 or FIG. 8.

In this embodiment of the present invention, the user equipment measures, in a first measurement period T1, reference signal received power W1, where T1 is a measurement period properly extended relative to a measurement period configured in the prior art. Therefore, precision in measuring W1 is relatively high. Then, the UE determines a first coverage level based on W1 and at least one coverage level. The at least one coverage level is obtained by adding a threshold increment to a preconfigured coverage level threshold, thereby improving accuracy in selecting a first resource by the UE. Finally, the UE performs random access at first transmit power by using the first resource, to increase a received signal to interference plus noise ratio of an access network device. Therefore, in this embodiment of the present invention, a success rate of performing, by the UE, random access on a non-anchor carrier is increased by using the method of improving the precision in measuring W1, the method of improving the accuracy in selecting the first resource, and the method of increasing the received signal to interference plus noise ratio of the access network device.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A random access method, comprising:
measuring, by a user equipment (UE) in a first measurement period T1, a reference signal received power (RSRP) W1 on an anchor carrier;
determining, by the UE, a first coverage level based on W1;
determining, by the UE, a first resource based on the first coverage level; and
performing a random access on a non-anchor carrier at a first transmit power P1 using the first resource, wherein P1 is a transmit power at which a narrowband preamble for the random access is sent at a minimum quantity of repetitions, wherein P1 is a smaller value of a maximum transmit power Pmax configured by a network and a transmit power P2 obtained by adding a positive power increment $\Delta P$ to a sum of an expected receive power Ph and an estimated downlink path loss PL, wherein Ph is an expected narrowband preamble receive power configured by the network, and PL is an estimated downlink path loss a serving cell accessed.

2. The random access method according to claim 1, wherein
when discontinuous reception (DRX) is not configured in a first condition, T1 is 1000 milliseconds, 1200 milliseconds, 1400 milliseconds, or 1600 milliseconds; or when the DRX is configured in the first condition, T1 is equal to eight times a discontinuous reception period or ten times a discontinuous reception period, wherein the first condition specifies that each of a first ratio and a second ratio is greater than or equal to −6 dB, the first ratio being a signal to interference plus noise ratio of a narrowband synchronization signal in a wireless environment, and the second ratio being a signal to interference plus noise ratio of a narrowband reference signal in the wireless environment; or
wherein when the DRX is not configured for a user equipment (UE) in a second condition, T1 is 2000 milliseconds, 2400 milliseconds, 2800 milliseconds, or 3200 milliseconds; or when the DRX is configured in the second condition, T1 is equal to eight times a DRX period or ten times the DRX period, wherein the second condition specifies that each of a first ratio and a second ratio is greater than or equal to −15 dB, the first ratio being a signal to interference plus noise ratio of a narrowband synchronization signal in a wireless environment, and the second ratio being a signal to interference plus noise ratio of a narrowband reference signal in the wireless environment.

3. The random access method according to claim 1, wherein the determining of the first coverage level based on W1 comprises:

determining the first coverage level based on a result of comparing W1 with at least one coverage level threshold, wherein the at least one coverage level threshold is received from an access network device, or determined based on at least one coverage level threshold received from an access network device and an incremental value, wherein the incremental value is preconfigured.

4. The random access method according to claim 1, wherein ΔP is 0.5*N, and N is a positive integer greater than or equal to 1.

5. A user equipment (UE), comprising:
a measurement unit, configured to measure, in a first measurement period T1, a reference signal received power (RSRP) W1 on an anchor carrier;
a determining unit, configured to determine a first coverage level based on W1, wherein the determining unit is further configured to determine a first resource based on the first coverage level, wherein the first resource is used by the UE to perform a random access on a non-anchor carrier; and
an access unit, configured to perform the random access on the non-anchor carrier at a first transmit power P1 using the first resource, wherein P1 is a transmit power at which the UE sends, at a minimum quantity of repetitions, a narrowband preamble for the random access, wherein P1 is a smaller value of a maximum transmit power Pmax configured by a network and a transmit power P2 obtained by adding a positive power increment ΔP to a sum of an expected receive power Ph and an estimated downlink path loss PL, wherein Ph is an expected narrowband preamble receive power configured by the network, and PL is an estimated downlink path loss a serving cell accessed.

6. The UE according to claim 5, wherein when discontinuous reception (DRX) is not configured for the UE in a first condition, T1 is 1000 milliseconds, 1200 milliseconds, 1400 milliseconds, or 1600 milliseconds; or when the DRX is configured for the UE in the first condition, T1 is equal to eight times a DRX period or ten times the DRX period, wherein the first condition specifies that each of a first ratio and second ratio is greater than or equal to −6 dB, the first ratio being a signal to interference plus noise ratio of a narrowband synchronization signal in a wireless environment, and the second ratio being a signal to interference plus noise ratio of a narrowband reference signal in the wireless environment; or
wherein when discontinuous reception is not configured for the UE in a second condition, T1 is 2000 milliseconds, 2400 milliseconds, 2800 milliseconds, or 3200 milliseconds; or when the discontinuous reception is configured for the UE in the second condition, T1 is equal to eight times a DRX period or ten times the DRX period, wherein the second condition specifies that each of a first ratio and second ratio is greater than or equal to −15 dB, the first ratio being a signal to interference plus noise ratio of a narrowband synchronization signal in a wireless environment, and the second ratio being a signal to interference plus noise ratio of a narrowband reference signal in the wireless environment.

7. The UE according to claim 5, wherein the determining unit is configured to:
determine the first coverage level based on a result of comparing W1 with at least one coverage level threshold, wherein the at least one coverage level threshold is received by the UE from an access network device, or determined by the UE based on at least one coverage level threshold received from an access network device and an incremental value, wherein the incremental value is preconfigured.

8. The UE according to claim 5, wherein ΔP is 0.5*N, and N is a positive integer greater than or equal to 1.

9. A non-transitory storage medium that stores program instructions, when executed by a processor, cause the processor to perform operations comprising:
measuring, by a user equipment (UE) in a first measurement period T1, a reference signal received power (RSRP) W1 on an anchor carrier;
determining, by the UE, a first coverage level based on W1;
determining, by the UE, a first resource based on the first coverage level; and
performing a random access on a non-anchor carrier at a first transmit power P1 using the first resource, wherein P1 is a transmit power at which a narrowband preamble for the random access is sent at a minimum quantity of repetitions, wherein P1 is a smaller value of a maximum transmit power Pmax configured by a network and a transmit power P2 obtained by adding a positive power increment ΔP to a sum of an expected receive power Ph and an estimated downlink path loss PL, wherein Ph is an expected narrowband preamble receive power configured by the network, and PL is an estimated downlink path loss a serving cell accessed.

10. The non-transitory storage medium according to claim 9, wherein
wherein when discontinuous reception (DRX) is not configured for the UE in a first condition, T1 is 1000 milliseconds, 1200 milliseconds, 1400 milliseconds, or 1600 milliseconds; or when the DRX is configured for the UE in the first condition, T1 is equal to eight times a discontinuous reception period or ten times a discontinuous reception period, wherein the first condition specifies that each of a first ratio and a second ratio is greater than or equal to −6 dB, the first ratio being a signal to interference plus noise ratio of a narrowband synchronization signal in a wireless environment, and the second ratio being a signal to interference plus noise ratio of a narrowband reference signal in the wireless environment; or
wherein when the DRX is not configured for the UE in a second condition, T1 is 2000 milliseconds, 2400 milliseconds, 2800 milliseconds, or 3200 milliseconds; or when the DRX is configured for the UE in the second condition, T1 is equal to eight times a DRX period or ten times the DRX period, wherein the second condition specifies that each of a first ratio and a second ratio is greater than or equal to −15 dB, the first ratio being a signal to interference plus noise ratio of a narrowband synchronization signal in a wireless environment, and the second ratio being a signal to interference plus noise ratio of a narrowband reference signal in the wireless environment.

11. The non-transitory storage medium according to claim 9, wherein the determining of the first coverage level based on W1 comprises:
determining, by the UE, the first coverage level based on a result of comparing W1 with at least one coverage level threshold, wherein
the at least one coverage level threshold is received from an access network device, or determined based on at least one coverage level threshold received from an access network device and an incremental value, wherein the incremental value is preconfigured.

12. The non-transitory storage medium according to claim 9, wherein $\Delta P$ is 0.5*N, and N is a positive integer greater than or equal to 1.

* * * * *